(No Model.)
H. VAN BIBBER.
SAW.
No. 245,588. Patented Aug. 9, 1881.
Fig. 1.
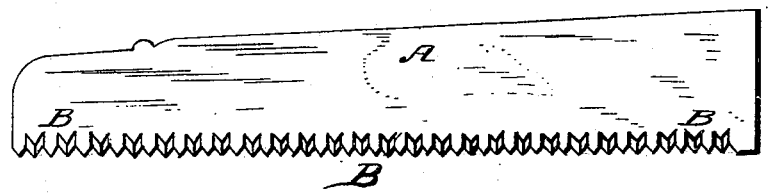
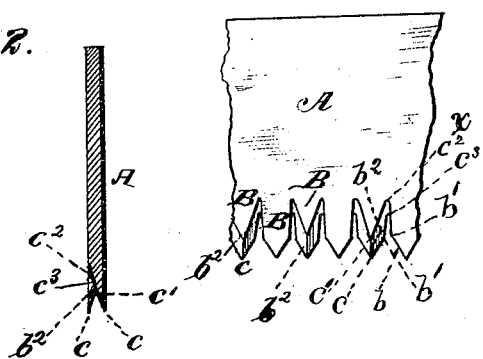
Fig. 2.  Fig. 3.
Witnesses
Fred G. Dieterich
Joseph F. Power
Inventor
Harrison Van Bibber
by Louis Bagger & Co.
Attorneys

UNITED STATES PATENT OFFICE.

HARRISON VAN BIBBER, OF ELHI, ASSIGNOR OF ONE-HALF TO ALBERT T. HIGBY, OF SKAGIT, WASHINGTON TERRITORY.

SAW.

SPECIFICATION forming part of Letters Patent No. 245,588, dated August 9, 1881.

Application filed October 23, 1880. (No model.)

*To all whom it may concern:*

Be it known that I, H. VAN BIBBER, of Elhi, in the county of Pierce and Territory of Washington, have invented certain new and useful Improvements in Saws; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved saw. Fig. 2 is a cross-section on an enlarged scale; and Fig. 3 is a detail view, also on an enlarged scale, showing the conformation of the teeth with their peculiar angles.

Similar letters of reference indicate corresponding parts in all the figures.

My invention has relation to saws for various purposes; and my improvement consists in the peculiar conformation of the teeth with rhomboidal cutting-edges and straight sides— that is, sides in a plane with the body of the saw-blade—as hereinafter more fully set forth, and particularly pointed out in the claim.

In the annexed drawings, the letter A represents the body of the saw-blade, and B the teeth.

For convenience I will describe the saw and its manufacture, beginning at the end designated by the letter $x$ in Fig. 3.

In the first place the file is adjusted at the proper angle to cut the bevel (marked $b$) upon one tooth, which said bevel extends to a point, $b'$, upon one tooth and the beveled plane $b^2$ upon the opposite tooth. This plane $b^2$ extends from the point $c$ of the tooth up to the point $b'$, and from the point $c'$ (in a vertical line with $c$) to the end of the notch or recess $c^2$. Thus it will be seen that the beveled plane $b^2$ is in the shape of a rhomboid with four sharp corners—viz., $c$, $c'$, $c^2$, and $b'$—and it will also be seen that at the upper corner, $c^2$, at the top of the notch, are formed two sharp cutting-edges, $c^3$, by the continuation of two intersecting planes, $b^2$, of opposite teeth, down to the body of the saw. The reverse or flat side of the tooth is in a line with the body of the blade, as shown in Fig. 2, and alternating teeth are beveled on opposite sides to form the rhomboidal planes $b^2 b^2$, divided by the central ridge, $c\ c'$, and upper triangular flat part of the tooth, as clearly shown in the drawings.

This saw requires no "setting" of the teeth, is easily sharpened when required, and works easily and rapidly even in the hardest kinds of woods.

I am aware of the Letters Patent No. 58,297, granted to E. J. Robinson, on the 25th day of September, 1866, upon which the saw described in the foregoing specification is an improvement; and, hence,

What I claim, and desire to secure by Letters Patent of the United States, is—

The saw herein shown and described, consisting of the blade or body A and teeth B, said teeth being alternately formed with beveled rhomboidal faces $b^2$, the upper corners of opposite rhombs intersecting one another in the corner $c^2$ of the notch, as shown at $c^3$, and the entire opposite faces of alternating teeth lying in a vertical plane with the body of the saw when ready for use, whereby subsequent setting is rendered unnecessary, substantially as and for the purpose herein shown and specified.

In testimony that I claim the foregoing as my own I have hereto affixed my signature in presence of two witnesses.

HARRISON <sup>his</sup> × <sup>mark.</sup> VAN BIBBER.

Witnesses:
C. D. EMERY,
JOHN M. RIBLING.